United States Patent [19]

Eschbach et al.

[11] Patent Number: 5,802,214
[45] Date of Patent: Sep. 1, 1998

[54] METHOD FOR DETERMINING AND LOADING AN IMAGE-DEPENDENT LOOK-UP TABLE FOR GENERATING AN ENHANCED IMAGE REPRESENTATION

[75] Inventors: Reiner Eschbach, Webster; William A. Fuss, Rochester, both of N.Y.; Charles M. Hains, Altadena, Calif.

[73] Assignee: Xerox Corporation, Stamford, Conn.

[21] Appl. No.: 569,808

[22] Filed: Dec. 8, 1995

[51] Int. Cl.$^6$ .................................................. G06K 9/40
[52] U.S. Cl. .................................... 382/254; 382/319
[58] Field of Search .............................. 382/319, 318, 382/312, 255, 274, 275, 254; 358/505, 509, 510

[56] References Cited

U.S. PATENT DOCUMENTS

| | | | |
|---|---|---|---|
| 4,888,492 | 12/1989 | Arimoto | 382/274 |
| 4,947,444 | 8/1990 | Nagaoka | 382/319 |
| 4,955,067 | 9/1990 | Shimura | 382/319 |
| 5,123,060 | 6/1992 | Cho et al. | 382/274 |
| 5,513,018 | 4/1996 | Nishimura | 382/319 |

*Primary Examiner*—Yon J. Couso
*Attorney, Agent, or Firm*—Fay, Sharpe, Beall, Fagan, Minnich & McKee

[57] ABSTRACT

A scanner generates a first set of M-bit signals representing an image in a document. A default table translates the M-bit signals into linearized N-bit signals where M>N. A color image processing module processes the N-bit signals to generate an image-dependent look-up table which, thereafter, is loaded into the scanner. The scanner then generates a second set of M-bit signals using a high resolution re-scan of the same image. The second set of M-bit signals are translated into N-bit signals using the image-dependent look-up table to generate an electronic representation with enhancement characteristics.

16 Claims, 8 Drawing Sheets

IMAGE 1 ORIGINAL

FIG. 6A

IMAGE 1 AFTER APPLYING AIE
LOOK UP TABLE

FIG. 6B

IMAGE 2 ORIGINAL

FIG. 7A

IMAGE 2 AFTER APPLYING AIE
LOOK UP TABLE

FIG. 7B

IMAGE 3 ORIGINAL

FIG. 8A

IMAGE 3   AFTER APPLYING AIE
LOOK UP TABLE

FIG. 8B

27
METHOD FOR DETERMINING AND LOADING AN IMAGE-DEPENDENT LOOK-UP TABLE FOR GENERATING AN ENHANCED IMAGE REPRESENTATION

BACKGROUND OF THE INVENTION

The present invention is directed toward the art of image scanners, and specifically, toward a method and apparatus for utilizing an image-dependent look-up table for translating scanner generated signals into processor usable data signals. More particularly, the invention comprises a first preliminary scan of a document to obtain a representative distribution of scan data, which data is used to generate the image-dependent look-up table for an optimal match between an internal precision of the scanner and the external precision of a particular associated external device. Optimal scanner and imaging capabilities are exploited by generating the look-up table prior to a second high resolution scanning of the document by the scanner. Thus, the invention permits the generation of the image-dependent look-up table for optimal image enhancement and minimal quantization prior to the high resolution scanning of the document by the scanner.

Scanners are often used by customers to generate an electronic representation of an image which is then exported for further processing or display on a printer or CRT device. A typical goal for a scan-to-print image processing system is to reproduce the input image as accurately as possible, i.e., render a copy. Thus, copies have been rendered as accurately as possible, flaws and all.

Briefly, scanners use sensing elements to detect light reflected from an image placed on a platen of the scanner. The sensing elements convert the reflected light into M-bit internal digital signals. One problem with currently used scanners is that the internal M-bit digital signals produced by the light-sensing elements are not directly proportional to the intensity of light reflected from the image. In other words, the output of the light-sensing element is not linearly related to the light input for the full available dynamic range of the sensing element. There is always a sensing element translation between light input and digital internal signal conversion for printer processing.

Generally, post-scanner processing presumes that signals outputted by the scanner represent a linear conversion of light reflected from the particular image. If the scanner signals are not proportional to the intensity of light reflected from the image, the informational content of the image signals may be severely degraded, if not lost, during subsequent post-scanner processing. The non-linearized format of the internal scanner signal is incompatible with the format required by post-scanner applications. A translation of the non-linear internal signals to linear output signals must occur prior to post-scanner processing applications including hard copy reproduction of the image.

A typical conventional system comprises translation of the M-bit internal digital signals within the scanner using a default look-up table. Ultimately, the default table translates the M-bit internal signals into linear N-bit signals where M>N. The scanner has a higher precision internally than external processing for reproductions. However, once translated, the digital signals are in a format compatible with the external post-scanner applications.

The default table is static or unchanging from image to image which means the same default table is used for each image. It is totally blind with respect to whatever document is being scanned. In operation, the default table is addressed by the M-bit internal signals to produce corresponding outputs in N-bit format which are then exported for post-scanner application. Since the default table translates M-bit non-linear signals into N-bit linear signals and M>N, two or more distinct sensing element output signals may be translated into the same N-bit linear signal. As a result, truncation occurs in signal translation. The truncation may result in resolution degradation, particularly for the dark end of the scanner dynamic range.

The default table is set up to provide a linear translation for the full dynamic range of the scanner sensing element output. Since few images require the full dynamic range of the sensing elements, rarely will the full dynamic range of the linear or default table be utilized. Typically, only a sub-part of the full dynamic range is needed to convert a typical image into an electronic representation. Accordingly, use of the default table results in lost image resolution, particularly when much of the image information is contained in a small portion of the dynamic range.

In addition to the resolution problem, another problem results from customer demand that their document reproduction be better than the original image in terms of contrast, sharpness, saturation, etc.

Until recently, image quality from the output of a scan to print system was directly related to the input image quality. One very common set of input images includes photographs. Unfortunately, photography is an inexact science, particularly among amateurs, and original photographs are often poor. Alternately, technology, age or image degradation often result in pictures having an unsatisfactory and undesirable appearance. What is desired, then, is a copy with enhanced features, and not necessarily a duplicate of the original.

Photography has long dealt with this issue. Analog filters and illumination variations can improve the appearance of pictures in the analog photographic process. Thus, for example, yellow filters enhance the appearance of white clouds against a blue sky in black and white images. Further, various electrophotographic devices, including digital copiers, can clean up and improve images by threshold adjustment, filtering or background suppression. Generally, these methods are manual methods which a user must select on an image by image basis. Unfortunately, the casual user is not skilled enough to perform these operations. The inability to perform image enhancement operations is exacerbated when additionally dealing with color controls.

In addition to manual methods, it turns out that the image can always be processed to improve its reproduction characteristics if certain processing assumptions are made that are accurate for most cases. Most of the time, processing the image increases contrast, sharpness, and/or color saturation, and improves the image. Prior art processing tends to produce better images, but the process is unstable, in that for multi-generation copying, increases in contrast, saturation, or sharpness are undesirable and ultimately lead to a severe image degradation. Further, the process may undesirably operate on those images which are already acceptable.

Alternatively, improvements can be made using various automated image enhancement processing techniques which operate to vary images which are not perceived as good images, but do not operate on images which do not need to be improved, thereby allowing a stable process.

Such various techniques for image enhancement are described in U.S. Pat. Nos. 5,414,538 (exposure enhancement of images by adjusting light intensity levels), 5,371,615 (color shift enhancement of images using image black and white points), 5,357,352 (color shift enhancement using averaged chrominance values for select subsets of its image signals), 5,363,209 (enhancement of local and general image contrast to predetermined values), 5,347,374 (enhancement of image exposure, color balance, and contrast using a combined tone reproduction curve), 5,450,217 (enhancement of average image saturation to a predetermined value), and 5,450,502 (enhancement of local contrast in images using histogram variance values), all of which are incorporated herein by reference and assigned to the assignee of the present application.

Each of these improvements are made to the image in a post scanner automated image enhancement module. As a result, the improvements are made after default table translation of internal M-bit signals to N-bit signals, where image resolution is less than maximized and the translation is accordingly less than optimal. Thus the translation operates on data that are already quantized or truncated, in many cases attempting to undo the quantization.

The present invention provides a new and improved apparatus and method of image enhancement which overcomes the above-referenced problems and others by generating a look-up table for translating the internal scanner signals to optimal external signals prior to high resolution scanning of the subject document or image.

SUMMARY OF THE INVENTION

In accordance with the invention, there is provided a method and apparatus of loading an image-dependent look-up table into a scanner.

In accordance with one aspect of the invention, there is provided a method of using a scanner to generate an electronic representation of a natural scene image, including the steps of loading into scanner memory a first look-up table for translating M-bit scanner stimulus signals into N-bit linearized signals suitable for post-scan processing where M is greater than N; preliminarily scanning the natural scene image to generate a first set of M-bit signals representing the natural scene image; translating the first set of M-bit signals into a first set of N-bit signals using the first look-up table; generating an image enhancement signal at a color image processing module from the first set of N-bit signals; generating an image-dependent look-up table for translating M-bit signals into N-bit linearized signals; loading the image-dependent look-up table into scanner memory; high resolution rescanning of the natural scene image to generate a second set of M-bit signals representing the natural scene image; and using the image-dependent look-up table for translating the second set of M-bit signals into a second set of N-bit signals whereby the second set of N-bit signals is adjusted in accordance for optimal matching with the image characteristics of the natural scene image.

One advantage of the present invention is that scanners operating in accordance with the method generate an electronically encoded natural scene image adjusted in accordance with resolution characteristics of the natural scene image after a low resolution scanning of the image. Simply stated, the prior art employs lower precision post scanner processing to generate an enhanced signal while the subject invention can generate an enhanced image representation from the higher precision scanner itself. These and other aspects of the invention will become apparent from the following descriptions used to illustrate the preferred embodiment of the invention, read in conjunction with the accompanying drawings.

DETAILED DESCRIPTION OF THE INVENTION

Figure 1:
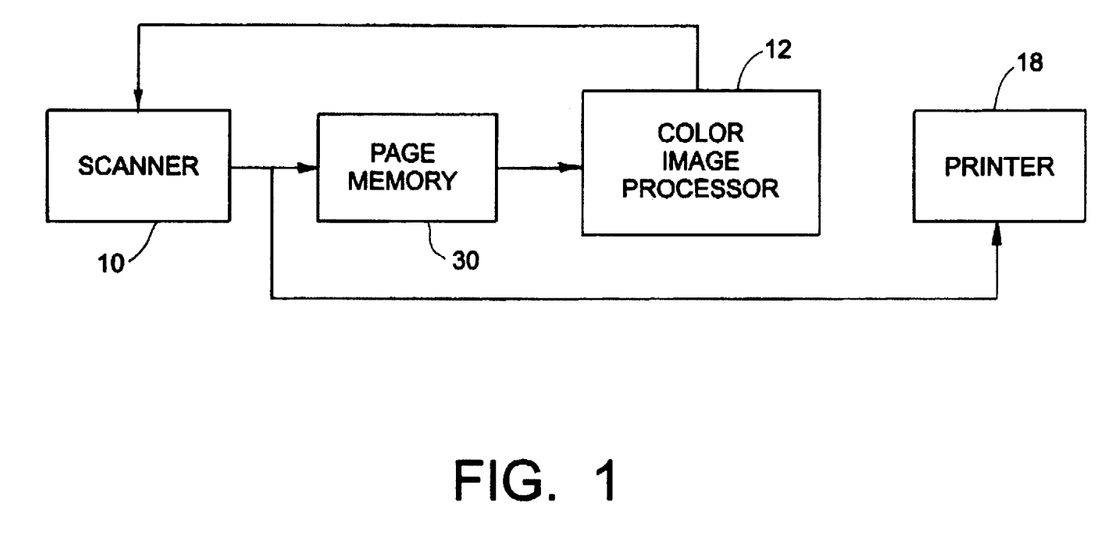
FIG. 1 comprises a block diagram representative of an assembly comprising the present invention.

Referring now to the drawings which are made for the purpose of describing several embodiments of the invention and not for limiting same, reference is made to FIG. 1's scan-to-print system in which the present invention may find advantageous use. The method of the invention is illustrated in detail in the flowchart of FIG. 4. The following description refers to FIGS. 1, 2, and 4. A document containing a natural scene image is placed on a platen of scanner 10. Thereafter, a first preliminary low resolution scan is performed 412 in which light intensity signals, reflected from the document are converted 414 into first scan signals comprising non-linear M-bit signals. A default table, preloaded 410 into memory of the scanner 10, translates 416 the non-linear M-bit image signals into linear N-bit image signals as required for post-scanner processing, where M is greater than N. Color processing module 12 receives and processes the linearized N-bit image signals to identify an image enhancement which can be achieved by use of an image-dependent look-up table (LUT) which is loaded 446 into memory of scanner 10. Thereafter, scanner 10 performs 448 a high resolution rescan of the image to generate 450 a second set of non-linear M-bit signals representing the image. The image-dependent look-up table translates 452 the second set of M-bit signals into linearized and enhanced N-bit signals, whereby the N-bit signals are adjusted in accordance with the particular characteristics of the image. A reproduction of the original document including the image is made by printer 18 in accordance with the adjusted N-bit signals. The image of the reproduction includes heightened resolution characteristics including enhanced contrast, exposure, color balance or others.

Scanner 10 may be a color or black and white scanner which produces image signals defined in RGB space for color images or density space for black and white images. The remaining description will be made with respect to color scanners, it being understood that the present invention is applicable for use with black and white scanners.

The images of concern are usually pictorial in nature, i.e., they represent natural scenes. While certain computer generated images may qualify as representing natural scenes, the contemplated scenes are predominantly scanned photographs.

The images themselves are defined in terms of pixels, wherein each pixel has a gray value which varies between a white level and a black level. For scanners which generate N=8 bit linear image signals, 256 levels of gray will be available for post-scanner processing. Pixels are also identified in terms of position, i.e., a pixel defines a unique area within an image, identified by its position in a scan line and a scan line position in a page. Color is therefor represented by triplets of gray pixels for each color pixel in the image, each triplet of gray pixel defining the color in each separation, which together form the color pixel.

With particular reference to FIG. 1, the N-bit image signals, after being translated by the pre-loaded default look-up table, are transferred to the color processing module 12 which consists of one or more distinct image-dependent enhancement signal generators. The image-dependent enhancement signal generators may operate alone or in combination on the N-bit image signals. When in combination, the enhancement signal generators generate a final imagedependent look-up table loadable into memory of scanner 10.

Figure 2:
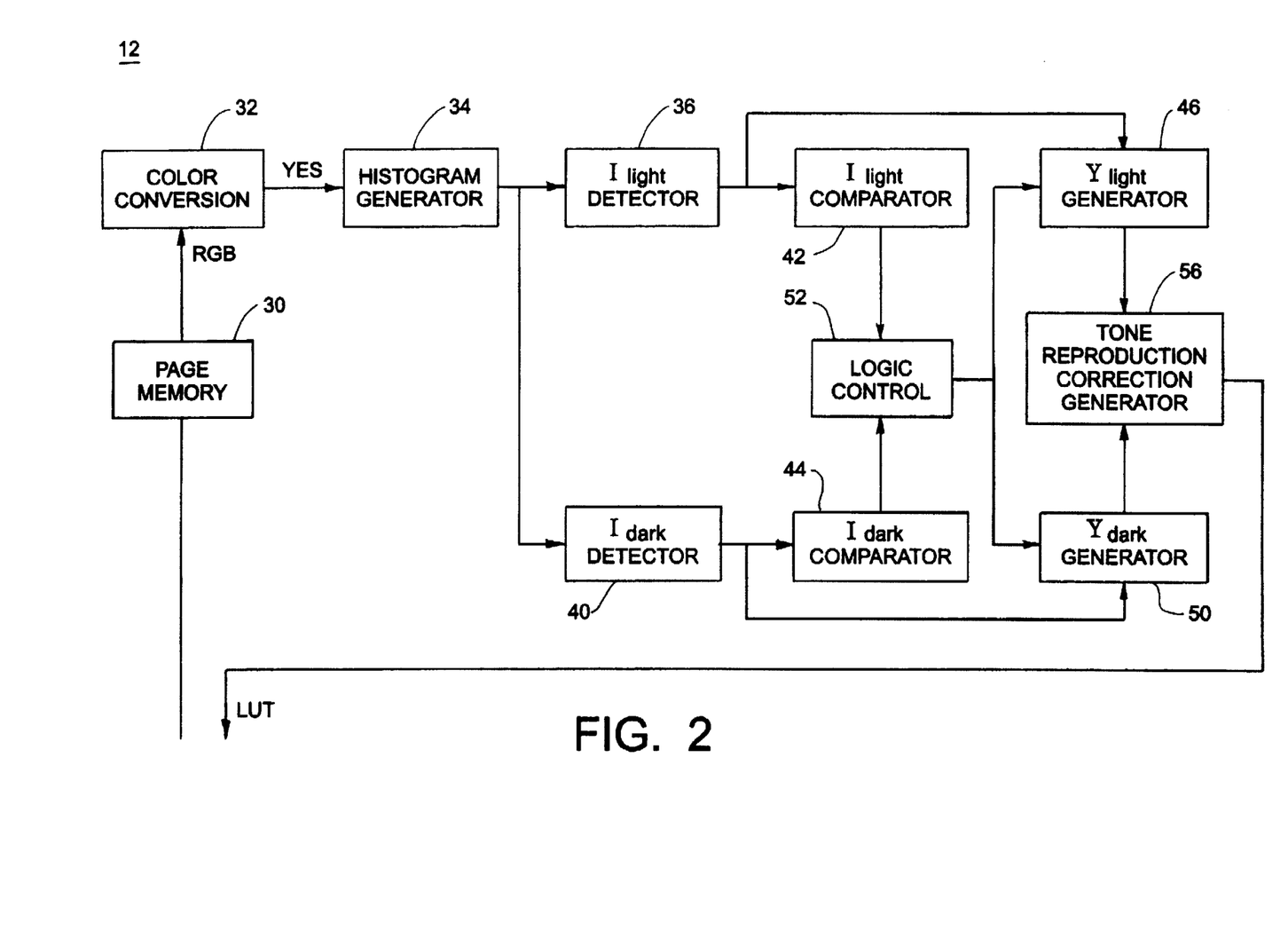
FIG. 2 comprises a detailed block diagram of the color image processor 12 shown in FIG. 1.

In one embodiment, the image processing module 12 generates an image-dependent LUT (look-up table) which adjusts the exposure of the M-bit image signals in accordance with the dynamic range of the gray pixel values of the particular image, as will now be described. FIG. 2 shows a page buffer memory 30 which stores image data defined in N-bit R,G,B (Red, Green, Blue) space. A color space converter 32 translates N-bit R,G,B image data into luminance space. $YC_1C_2$ luminance space provides one such useful space where Y represents luminance or intensity of the image. Also useful is any set of color coordinates to an expression where one term relates to overall image intensity or density such as Y of Xerox YES of the "Xerox Color Encoding Standard," XNSS 289005, 1989. Whatever space used must have a component which relates to the human visual perception of lightness or darkness. It should be noted that it would be sufficient to transform the R,G,B data to pure intensity data, ignoring the chrominance signal, where as here, the scanner loaded, exposure correction LUT is applied to R,G,B channels in scanner 10.

Figure 3:
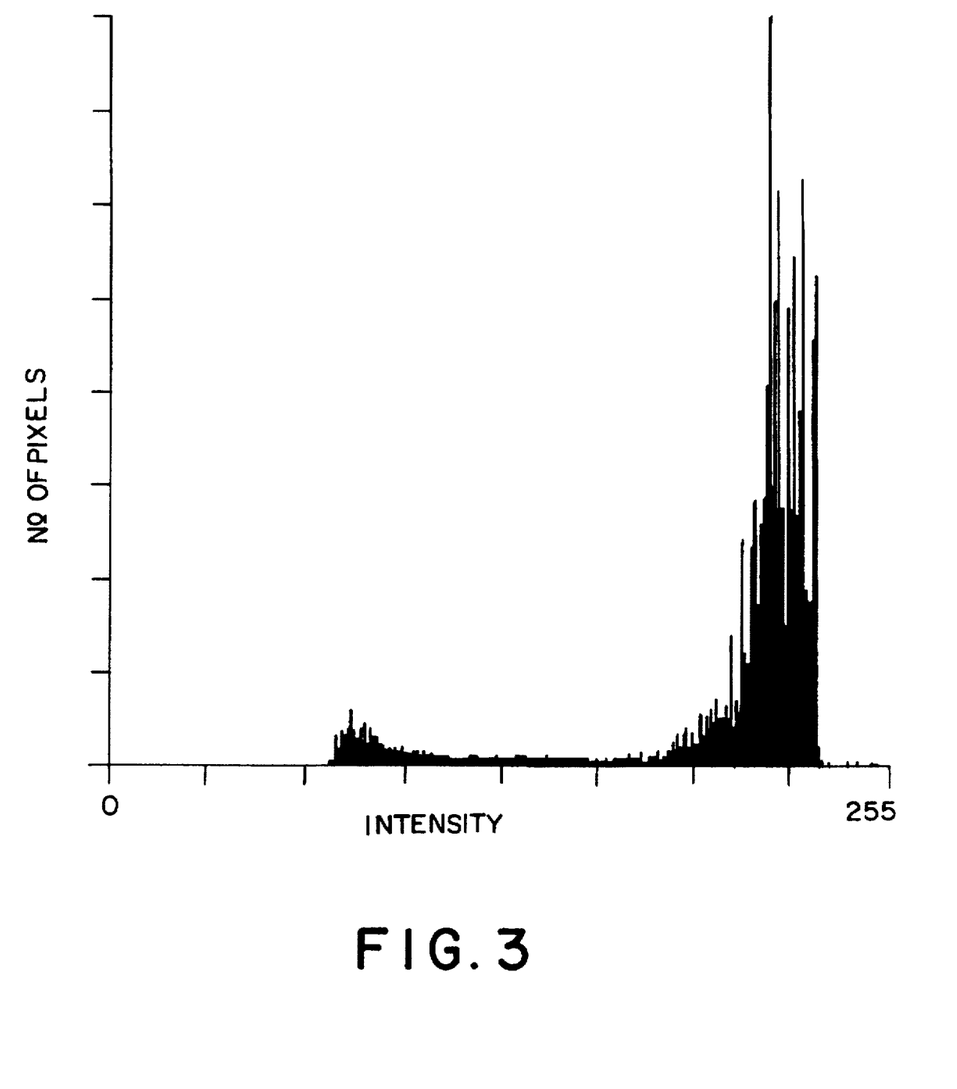
FIG. 3 comprises a statistical distribution of scanner stimulus signals from a first preliminary scan employed in the method of the subject invention.

A histogram generator 34 generates a histogram signal H(I) from the image signals. Histograms map the statistical distribution of pixels at each intensity level possible within an image, i.e., the dynamic range of first scan signals. In a multi-bit space, such as 8-bit space, the intensity levels will be distributed between 0 and 255. FIG. 3 shows one such distribution.

Figure 4:
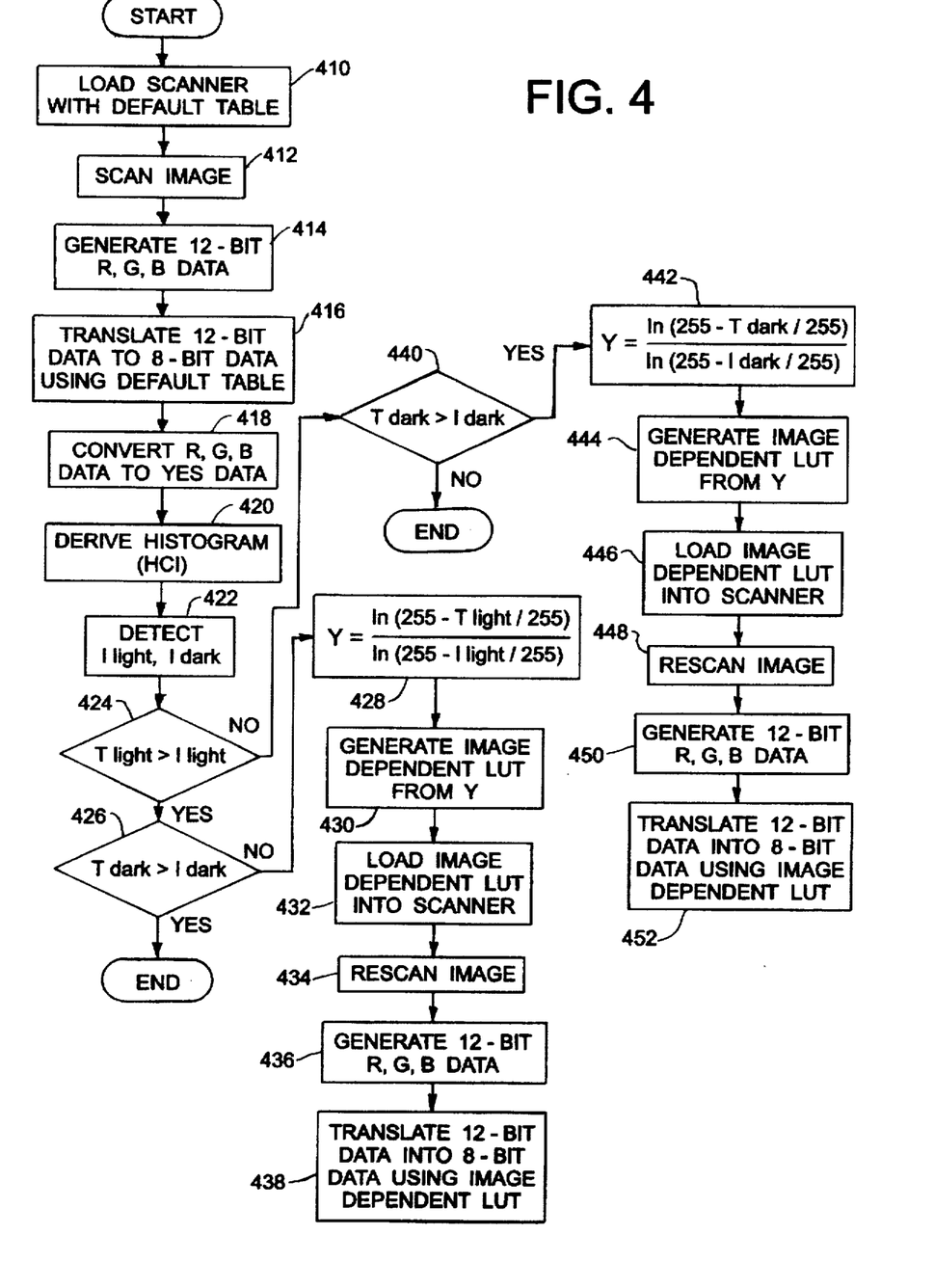
FIG. 4 comprises a detailed flow chart of the method of the subject invention.

With continued reference to FIGS. 2 and 4, $I_{light}$ detector 36 and $I_{dark}$ detector 40 identify a maximum and a minimum intensity level contained in a particular image. These values are selected at the far ends of the range defined by the histogram signal H(I). Thus, the histogram signal ranges from $I_{light}$ to $I_{dark}$.

Intensity comparators 42 and 44 compare $I_{light}$ and $I_{dark}$ to $T_{light}$ and $T_{dark}$ respectively 424, 426, 440. $T_{light}$ and $T_{dark}$ represent light and dark intensity levels that well-exposed images usually contain. When $I_{light}$ exceeds $T_{light}$, $Y_{light}$ generator 46 is enabled 428, 442 to generate $Y_{light}$ from $I_{light}$ and $T_{light}$ in accordance with the following:

$$Y_{light} = \frac{\ln[T_{light}/255]}{\ln[I_{light}/255]}$$

Likewise, when $T_{dark}$ exceeds $I_{dark}$, $Y_{dark}$ generator 50 is enabled to generate $Y_{dark}$ in accordance with the following:

$$Y_{dark} = \frac{\ln[T_{dark}/255]}{\ln[I_{light}/255]}$$

Logic control circuit 52 monitors the comparators 42 and 44 and disables generation of $Y_{light}$ and $Y_{dark}$ when $I_{light}$ exceeds $T_{light}$ and $T_{dark}$ exceeds $I_{dark}$. When this condition occurs, generally there is an exposure problem associated with the particular image which cannot be corrected using a scanner loaded image dependent LUT.

A tone reproduction correction generator provides 430, 444 the scanner loadable LUT of exposure corrected responses addressed by uncorrected responses in accordance with one of the generated Y values. Specifically, the relationship between intensity $I_{in}$, of the uncorrected responses and intensity $I_{out}$ of the corrected responses can be defined by:

$$I_{out} = I_{in}{}^Y$$

That is, $I_{out} = I_{in}$ to the Y power. In effect, a stretching function is applied to the dynamic range of the first scan so that the rescanning data can be optimally matched by the LUT to the second processor signals for an enhanced image.

The scanner LUT is generated with either $Y_{light}$ or $Y_{dark}$, but not both. As noted, when $I_{light}$ exceeds $T_{light}$ and $T_{dark}$ exceeds $I_{dark}$, problems exist with the image that cannot be enhanced by the color processing module. In this instance, the logic control disables the Y generators and no image-dependent look-up table is generated. The look-up table would instead be loaded with a simple truncation table or a default conversion table such as logrithmic.

Once the image-dependent LUT is generated, it is loaded 432, 446 into scanner 10 wherein it is used to translate a second set of M-bit signals representing the image. These M-bit signals represent a high resolution re-scan of the image. N-bit linearized and image enhanced signals, once translated by the image-dependent LUT of the scanner, are transmitted to the printer where they are converted from RGB space into CMYK (cyan, magenta, yellow and key) space prior to printing.

Figure 5:
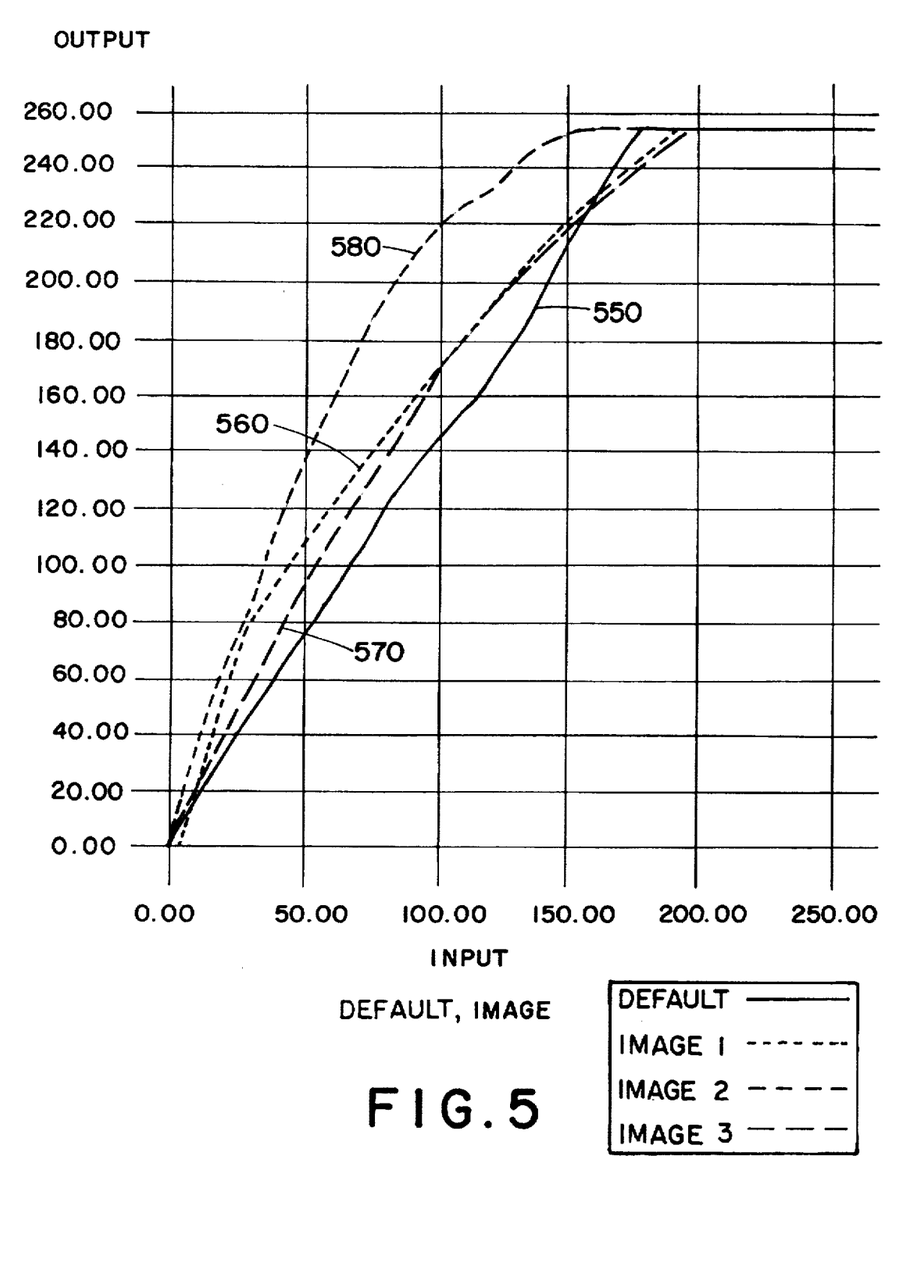
FIG. 5 comprises a graphical image of a plurality of look-up tables using the method of the present invention.
Figure 6A:
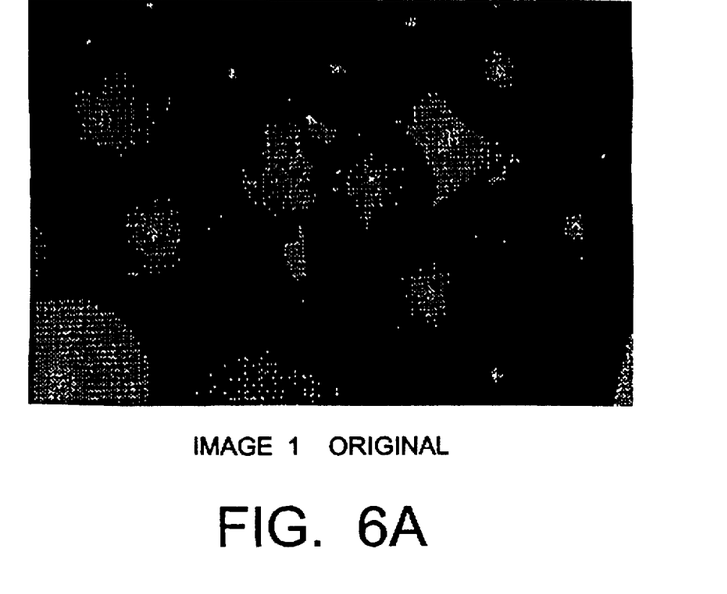
FIGS. 6A and 6B comprise associated images associated with line 560 of FIG. 5.
Figure 6B:
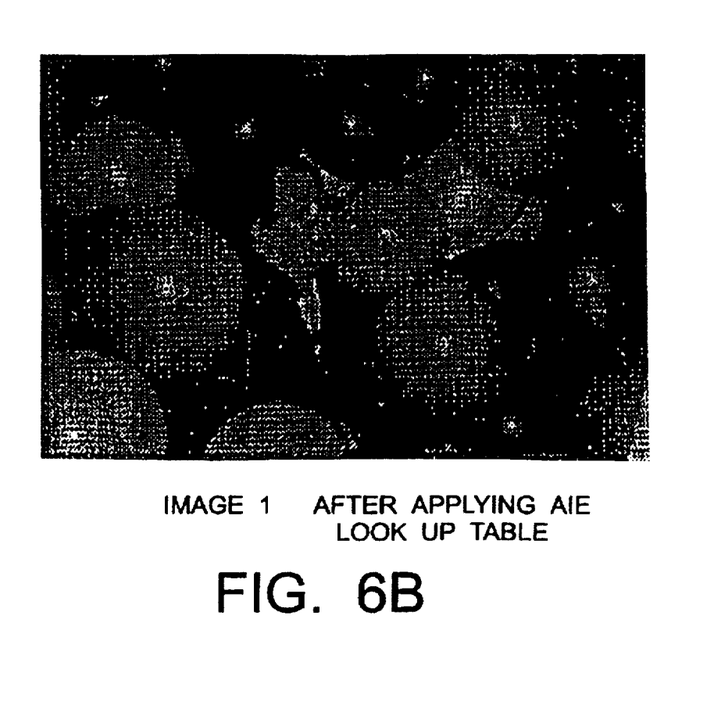
Figure 7A:
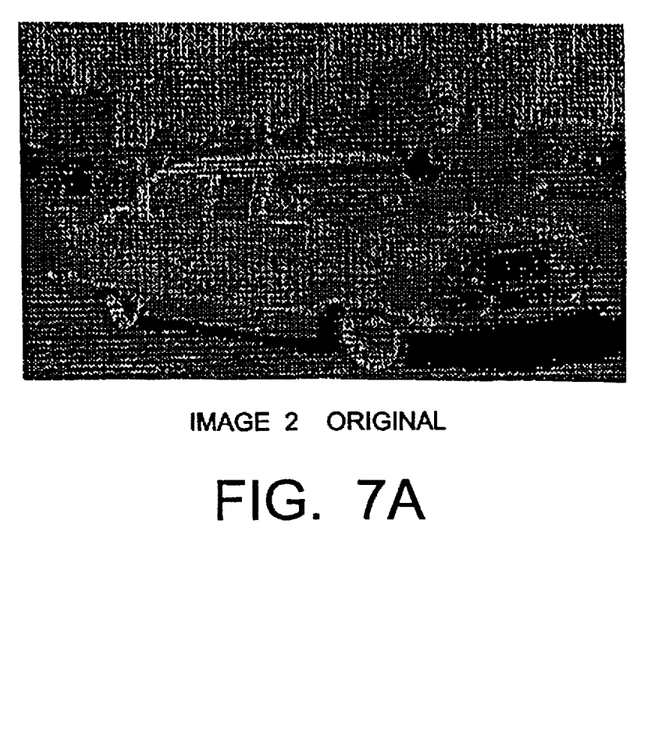
FIGS. 7A and 7B are images associated with line 570 of FIG. 5.
Figure 7B:
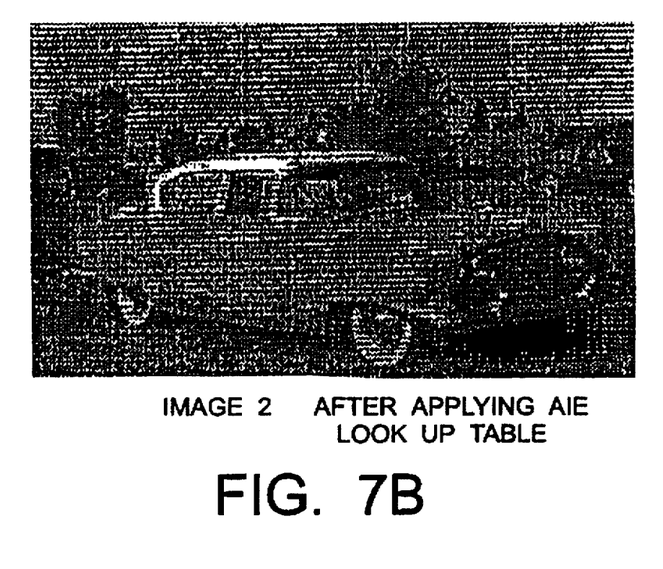
Figure 8A:
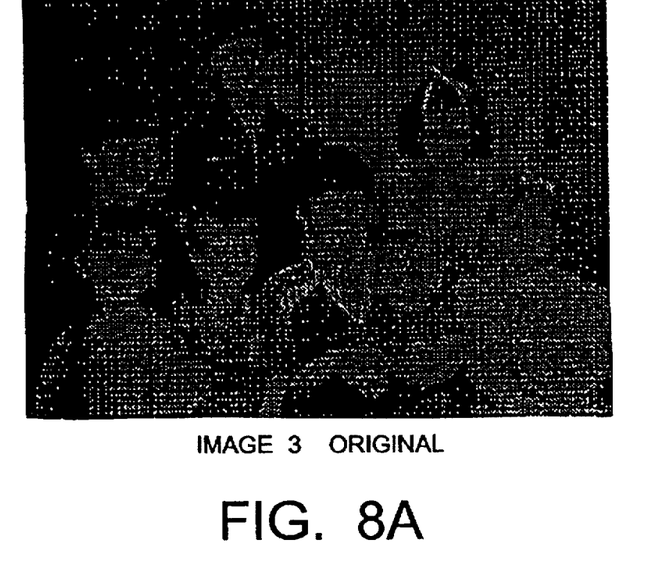
FIGS. 8A and 8B are images associated with line 580 of FIG. 5.
Figure 8B:
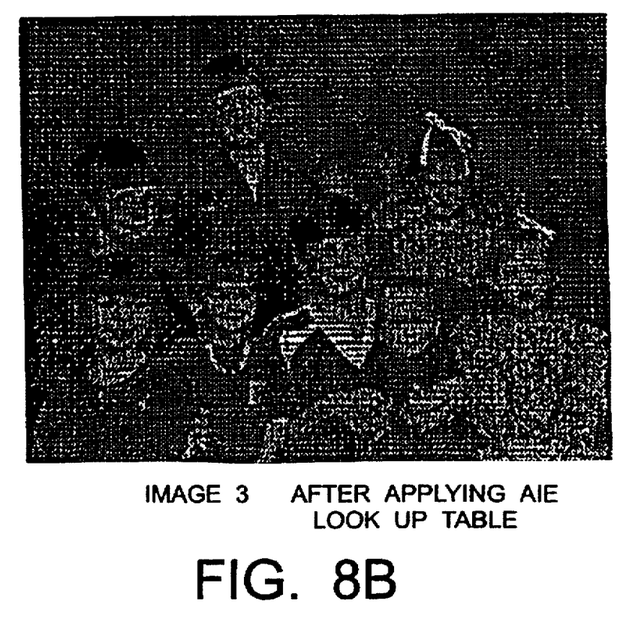

With particular reference to FIG. 5, an image-dependent LUT is particularly illustrated therein. More particularly, three sets of image-dependent LUT's are illustrated in association with the three different sets of figures comprising FIGS. 6–8, respectively. Solid line 550 comprises the default table which would be employed for the prescan for all images. Dotted lines 560, 570, and 580 respectively and graphically illustrate the image-dependent LUT's derived at color image processor 12 of subject invention for FIGS. 6A, 7A, and 8A, respectively. The printed, enhanced images using the image-dependent LUT's are shown as FIGS. 6B, 7B, and 8B respectively. It can be easily seen that the printed images comprise an enhancement of the original image. The images shown in FIGS. 6–8, all have very different characteristics. All were processed by the subject invention as gray scale images using a single TRC, although as noted above, subject invention is capable of enhancement processing, both gray scale and color.

With particular reference to FIG. 5, it can be seen that the LUT comprises a substantial lightening of the gray pixel value over the input signal over the default LUT. In particular, an input of 100 gives approximately a 145 image value for the default table, while for image 3, the same input will provide output of 220. As explained above, the input to the LUT comprises the second set of M-bit scan signals obtained from the second high resolution rescanning of the image while the output comprises the second processor signals representing the desired enhancement from the first processor signals derived from the default LUT.

The color image processing module has been described with respect to generating a look-up table which enhances exposure in accordance with the dynamic range of the particular image. Alternatively, the color image processing module may take form in one or more feature enhancement embodiments as described in U.S. Pat. Nos. 5,414,538 (exposure enhancement of images by adjusting light intensity levels), 5,371,615 (color shift enhancement of images using image black and white points), 5,357,352 (color shift enhancement using averaged chrominance values for select subsets of its image signals), 5,363,209 (enhancement of local and general image contrast to predetermined values), 5,347,374 (enhancement of image exposure, color balance, and contrast using a combined tone reproduction curve), 5,450,217 (enhancement of average image saturation to a predetermined value), and 5,450,502 (enhancement of local contrast in images using histogram variance values), which are incorporated herein by reference. Although all of these enhancement systems are specifically implemented in post-scanner processing, the subject invention can similarly exploit them by use of the pre-scan to identify a dynamic range of scan signals that can be used to generate an image-dependent look-up table for optimal matching of high resolution signals to the linearized processor signals.

The foregoing description will be made with respect to image enhancement using an image-dependent look-up table loaded in scanner 10. Without departing from the scope of the present invention, an alternative embodiment enhances image reproduction using a scanner MTF filter. In this alternative, enhancement signals generated by the color processing module 12 are used to calculate image-dependent filter coefficients, which are loaded into the scanner MTF filter. Thereafter, a high resolution re-scan of the image produces M-bit non-linear image signals which are filtered by the MTF filter to generate linearized and enhanced N-bit signals.

It will no doubt be appreciated that the present invention can be accomplished through application software accomplishing the functions through a hardware circuit, which will probably provide optimum speed, or through some combination of software and hardware.

The invention has been described with reference to a particular embodiment. Modification and alterations will occur to others upon reading and understanding the specification. It is intended that all such modifications and alterations are included insofar as they come within the scope of the appended claims or equivalents thereof.

Having thus described the invention, it is now claimed:

1. A method of generating an enhanced representation of an image from a scanner, comprising the steps of:

loading into a memory a first look-up table for translating scan signals into processor signals;

first scanning the image into the scanner for generating a first scan signal representative of an illumination dynamic range of the image;

translating the first scan signal into a first processor signal with the first look-up table;

determining an image enhancement function for the representation from the first processor signal by comparing the dynamic range with predetermined desired intensity levels;

generating an image dependent look-up table for translating the scan signals into the processor signals while incorporating the image enhancement including adjusting data values of the image dependent look-up table by the function;

loading the image-dependent look-up table into the memory;

rescanning the image to generate a second scan signal representative of the image; and, translating the second scan signal into a second processor signal with the image-dependent look-up table wherein the second processor signal comprises an enhancement of the first processor signal.

2. The method as described in claim 1 wherein the first scanning comprises a preliminary scanning of the image for identifying a statistical distribution of scanner stimulus signals representative of reflected light intensity comprising the first scan signal.

3. The method as described in claim 2 wherein the rescanning comprises a high resolution of the image in the scanner.

4. The method as described in claim 2 wherein an image-dependent look-up table comprises applying a stretching function to the statistical distribution of scanner stimulus signals for optimally matching the second scan signal to the second processor signal.

5. A method of using a scanner to generate an electronic representation of a natural scene image, the method comprising the steps of:

loading into scanner memory a pre-set default look-up table for translating scanner multi-bit signals into signals having a format suitable for post-scanner processing;

first scanning the natural scene image to generate a first set of scanner multi-bit signals representing the natural scene image;

translating the first set of scanner multi-bit signals into translated signals with post-scanner processing format, using the pre-set default look-up table;

using the translated signals at an image processing module for generating image-dependent filter coefficients derived by applying a stretching function determined from the translated signals for computing the filter coefficients and for reflecting processing of the natural scene image at the image processing module;

loading the image-dependent filter coefficients into a filter stored in scanner memory;

rescanning the natural scene image and generating a second set of scanner multi-bit signals representing the natural scene image; and filtering the second set of scanner multi-bit signals with the scanner filter operating in accordance with the image-dependent filter coefficients.

6. The method of claim 5 wherein the first and second set of scanner multi-bit signals are generated as a non-linear representation of the natural scene image.

7. The method of claim 6 wherein the translating step comprises translating non-linear representations of the first and second sets of scanner multi-bit signals into linearized bit signals.

8. The method of claim 5 wherein the first scanning comprises a low resolution scan for generating the first set of scanner multi-bit signals representing the natural scene image.

9. The method of claim 5 wherein the rescanning comprises a high resolution rescan for generating the second set of scanner multi-bit signals representing the natural scene image.

10. The method as described in claim 5 wherein the using the translated signals comprises identifying a dynamic range of the first set of scanner multi-bit signals for optimally matching the image-dependent filter coefficients therewith.

11. An apparatus for generating an enhanced electronic representation of a natural scene image, the apparatus comprising:

an image scanner which generates scan signals representing the natural scene image;

a first memory into which is loaded a first look-up table for translating first scan signals generated by the image scanner into first processor signals;

an image processing module which processes the first processor signals to generate an image enhancement signal derived by comparing the first processor signals with predetermined standards of desired representation of an image for processing of the natural scene image;

a look-up table adjustment circuit which generates an image-dependent look-up table by applying the image enhancement signal to data values of the table to compute adjusted data output values for the table; and a second memory into which is loaded the adjusted data output values of the image-dependent look-up table for translating second scan signals generated by the image scanner into second process signals.

12. The apparatus of claim 11 wherein the first scan signals are generated by a preliminary scanning of the image for identifying a statistical distribution of scanner stimulus signals representative of reflected light intensity comprising the first scan signal.

13. The apparatus of claim 11 wherein the second scan signals are generated by a high resolution scanning of the image in the scanner.

14. The apparatus of claim 11 wherein the scan signals are defined by M-bits, the processor signals are defined by N-bits, and M is greater than N.

15. The apparatus of claim 11 wherein the imagedependent look-up table stretches the statistical distribution of the second scanner signals for optimally matching the second scan signal to the second processor signal.

16. The apparatus of claim 11 wherein the first and second memories are contained within the image scanner.

* * * * *